United States Patent [19]

Mattei

[11] Patent Number: 4,711,336
[45] Date of Patent: Dec. 8, 1987

[54] APPARATUS FOR TRANSPORTING SUBSTANTIALLY PARALLELEPIPEDIC PACKETS

[75] Inventor: Riccardo Mattei, Bologna, Italy

[73] Assignee: G.D. Societa Per Azioni, Bologna, Italy

[21] Appl. No.: 811,096

[22] Filed: Dec. 19, 1985

[30] Foreign Application Priority Data

Jan. 28, 1985 [IT] Italy .................. 3316 A/85

[51] Int. Cl.⁴ .................................... B65G 37/00
[52] U.S. Cl. .............................. 198/347; 198/426
[58] Field of Search ........... 198/347, 426, 432, 444, 198/491, 357, 448, 461

[56] References Cited

U.S. PATENT DOCUMENTS 3,470,996 10/1969 Lee et al. ................... 198/347
4,499,987 2/1985 Long .......................... 198/347

Primary Examiner—James B. Marbert
Attorney, Agent, or Firm—Karl F. Ross; Herbert Dubno

[57] ABSTRACT

An apparatus for transporting substantially parallelepipedic packets (2) disposed between a machine (3) for supplying and a machine (4) for receiving these packets (2) comprising at least one horizontal conveyor (5, 6) connecting the machines (3, 4) and a cylindrical store (13) having radial compartments (25) designed to rotate intermittently about an axis parallel to the conveyor (5, 6) and tangential thereto such that the conveyor (5, 6) defines a base wall for the lower compartment (25) of the store (13). There are also provided devices (62, 63) for intercepting the packets (2) at both ends of the lower compartment (25) and means (68) for detecting whether this compartment (25) is full, a cylindrical fairing (34) winding about the store (13), and a connection bridge (38) disposed between the conveyor (5, 6) and an inlet edge (36) of the fairing (34) designed to assume different inclinations as a function of the direction of rotation of the store (13) and an extraction device (49) operating, under the control of the detection means (68), at one end of the lower compartment (25) for the removal from the latter of the packet (2) which completes the group before the closure of the respective interception device.

12 Claims, 3 Drawing Figures

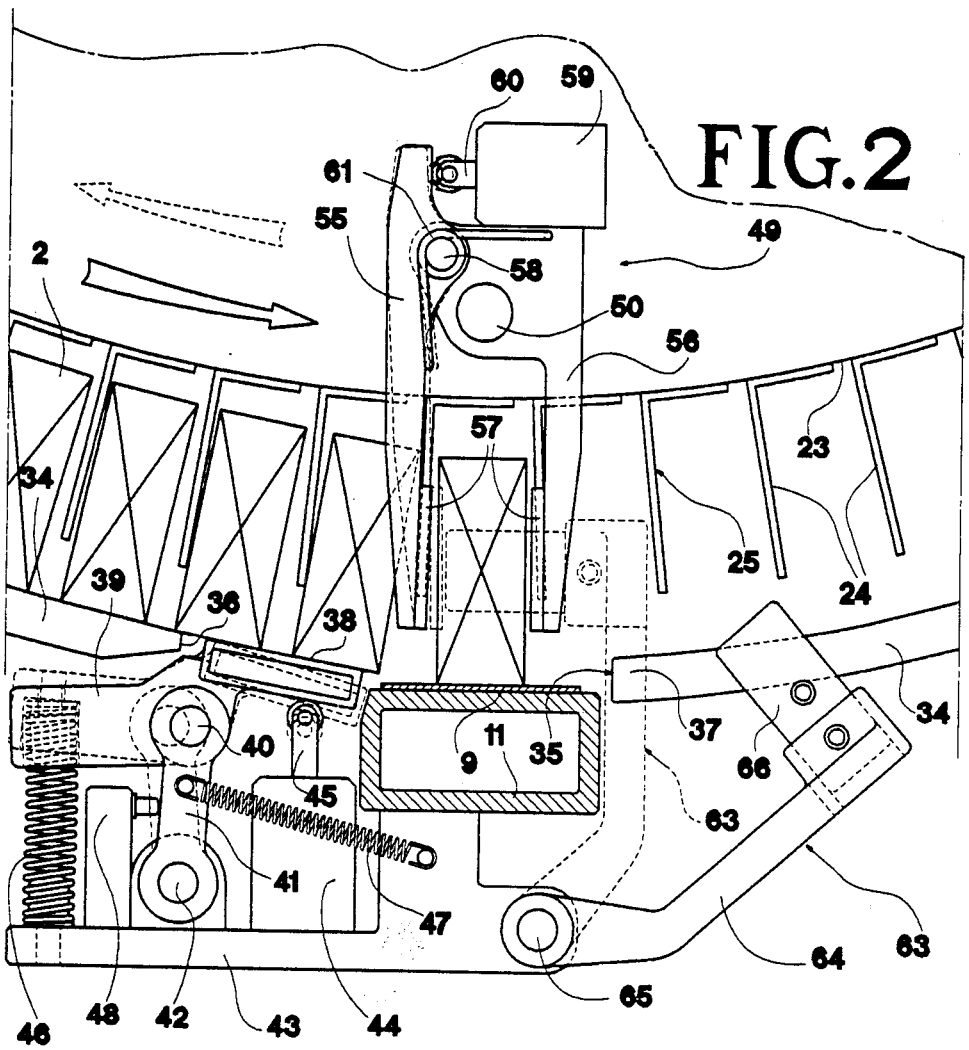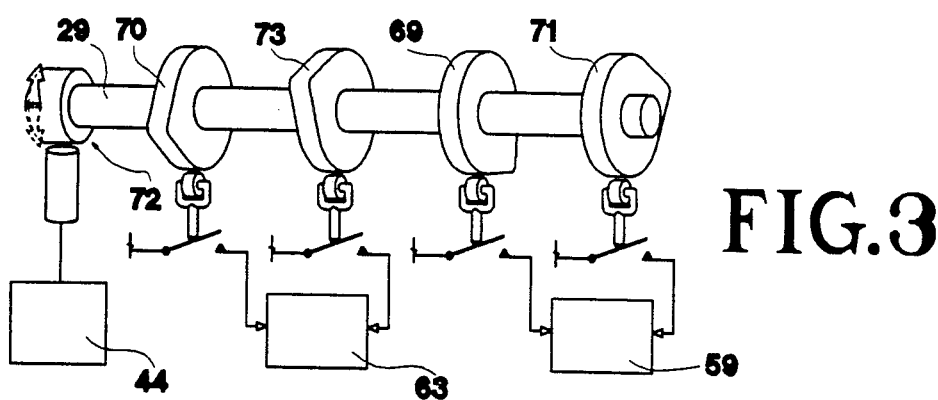

APPARATUS FOR TRANSPORTING SUBSTANTIALLY PARALLELEPIPEDIC PACKETS

FIELD OF THE INVENTION

The present invention relates to an apparatus for transporting substantially parallelepipedic packets. In the following description, particular reference is made to a transfer device disposed between machines designed to package and process packets of cigarettes.

BACKGROUND OF THE INVENTION

In accordance with the prior art, a machine for packaging cigarette packets is connected to a machine designed to further wrap the cigarettes by means of a conveyor along which there is provided a store designed to offset the different output rates of the two machines.

In conveyor apparatus of the known type, if the output of the two machines is fully synchronized the packets produced by the packaging machine are supplied in single file to the further wrapping machine. In the case of stoppage or slowing down of the output of one of the two machines, the packets are inserted in groups into the store or removed therefrom as necessary.

For example, if "tower" stores are used, the groups of packets are transferred during storage by means of thrust elements from the conveyor to the lower end of the store within which the groups themselves are stacked. As a result of this arrangement, the packets of cigarettes are subjected to pressures which may damage them as a result of the comparatively great height of these stores.

Stores are also known which are disposed in positions above the conveyor and formed by closed circuit conveyor belts to which there is rigidly connected a plurality of walls each two of which define compartments designed to contain groups of packets.

In cases in which the output of the two machines is synchronized the packets moving onto the conveyor pass through a compartment of the store. If the two machine do not then operate in a synchronized manner, for example if the further wrapping machines stops, the conveyor belt rotates about its end rollers taking a group of packets from the conveyor and moving a new empty compartment into the path of the latter. When, in contrast, the packaginq machine stops, the conveyor belt rotates about its end rollers in the direction opposite to the above direction thereby moving a compartment containing a group of packets into a position above the said conveyor The stored groups of packets are retained within the respective compartments by a fixed fairing winding around the store and having a gap in the vicinity of the supply conveyor This type of store, in addition to drawbacks linked to the use of belts or bands which may become worn and subject to play in the long term which is detrimental to correct operation, does not enable gentle handling of the packets of cigarettes both during storage and transfer to the conveyor.

It has been observed that, during the take-up and transfer of the groups of packets by the store, the packets may contact the edge of the fixed fairing and the edge of the conveyor with particularly damaging results in the case of soft packs.

In known apparatus, further possible damage to the packets may occur in the position in which the conveyor is inserted into the store. Stop means are operative in this position and are formed for example by oscillating bars or take-up means which operate fairly violently in order to stop the flow of packets from the packaging machine after the completion of each group so as to enable the store to remove the group from the conveyor It has also been observed that as a result of slight and unpredictable variations in the size of the packets, the longitudinal dimension of the group being formed may vary such that it projects beyond the end of the compartment and may interfere with fixed components at the time of rotation of the store.

OBJECT OF THE INVENTION

The object of the present invention is to provide an apparatus which overcomes all the drawbacks of the prior art discussed above, i.e. an apparatus in which any possibility of damage to the packets as a result of the movement of the store or the action of the stop means acting along the conveyor is completely eliminated.

SUMMARY OF THE INVENTION

This object is achieved by the present invention in that it relates to an apparatus for supplying substantially parallelepipedic packets between a machine for supplying and a machine for receiving these packets comprising at least one substantially horizontal conveyor connecting the said machines and a substantially cylindrical store having its axis parallel to the conveyor and provided on its periphery with angularly uniformly spaced radial compartments and disposed above the conveyor and substantially tangential thereto such that the conveyor defines a base wall for the lower compartment of the said store, means for the intermittent actuation of the store about its axis, devices for intercepting the packets at both ends of the lower compartment, a cylindrical fairing winding about the store, means for detecting whether the lower compartment is full, characterised in that it comprises, in the vicinity of the lower compartment and disposed between an edge of the conveyor and an inlet edge of the fairing, a connection bridge able to assume a first and a second position as a function of the direction of rotation of the store and a device for extracting single packets operating in the vicinity of the inlet end, with reference to the forward movement direction of the conveyor, of the lower compartment under the control of the detection means and movable with an alternating movement parallel to the axis of the store between an inner position and a position outside of the lower compartment.

BRIEF DESCRIPTION OF THE DRAWING

The invention will now be described with reference to the attached drawings which show, by way of non-limiting example, a preferred embodiment, in which:

FIG. 2 is a front view, on an enlarged scale, of a detail of FIG. 1, and

FIG. 3 is an electromechanical diagram showing the control of this apparatus.

SPECIFIC DESCRIPTION OF THE INVENTION

Figure 1:
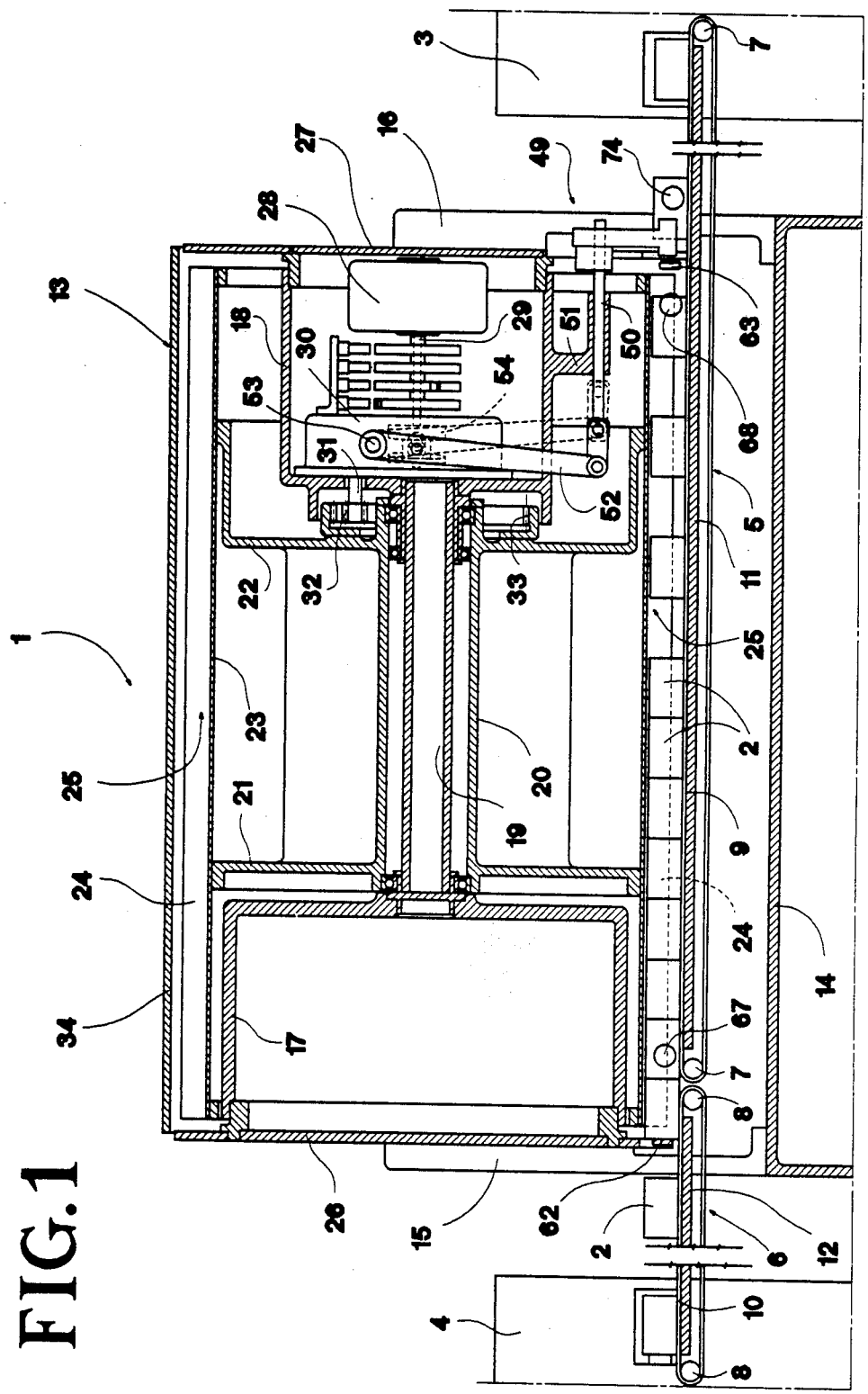
FIG. 1 is a diagrammatic side view of the apparatus of the present invention.

With reference to the above Figures, a device for supplying packets 2 of cigarettes disposed between a machine for supplying or a packaging machine, shown in outline by the block 3, and a machine for receiving or further wrapping machine, shown in outline by the block 4, is designated overall by 1.

The machines 3 and 4 are connected by horizontal conveyor belts 5 and 6 of the closed circuit type operating on respective rollers 7 and 8 and disposed one after the other.

A cylindrical store 13 having its axis parallel to the conveyors and supported by a base 14 by means of two uprights shown on the right and left by 15 and 16 is disposed above the two conveyors 5 and 6 whose upper branches 9 and 10 move in contact with guide elements 11 and 12 (see FIG. 2 also).

More precisely, the uprights 15 and 16 are fixed to the longitudinal ends of the store 13 formed by flanges 26 and 27 closing bell elements 17 and 18. The two bell elements 17 and 18 are coaxial with the store 13, have their respective concave portions facing outwardly and are connected together by a shaft 19, coaxial thereto, which supports a roller 20 in a rotary manner.

The two ends of the roller 20 are formed by two flanges, shown on the right and left by 21 and 22, fixed within a cylindrical body or drum 23 containing the bell elements 17 and 18 and the shaft 19.

A plurality of rods 24, having an L-shaped section and one of their arms projecting radially, is fixed to the outer surface of the cylindrical body 23 (see FIG. 2 also). These rods 24 are disposed with a constant pitch along the entire course of the surface of the cylindrical body 23 and define in pairs a radial compartment 25 designed to contain a group composed of a predetermined number of packets 2.

Within the latter there is housed a motor reducer 28 having a dual direction of rotation fixed to the cover 27, which actuates, via its output shaft 29 parallel to the shaft 19, a device of known type (not shown) designed to convert a continuous rotary movement into a discontinuous rotary movement. This device is housed within a box 30 fixed to the base of the bell element 18 and has an output shaft 31 parallel to the shaft 29.

The shaft 31 which projects from the bell element 18, transmits a discontinuous rotary movement by means of a gear 32 keyed on its free end to the inner teeth of a toothed crown 33 rigid with the roller 20.

As a result of the kinematic connection described above, after every continuous rotation through 360° of the shaft 29, called the cyclical shaft, the drum 23 is caused to stop and then rotated by an amplitude equal to the angle between two adjacent compartments.

More precisely, with reference to FIG. 2 and in accordance with the description given below, a movement in the clockwise direction corresponds to the storage of a group of packets 2 of cigarettes disposed on the conveyors 5 and 6, whilst a movement in the anticlockwise direction corresponds to the transfer of a group of packets 2 of cigarettes to the conveyors 5 and 6.

A cylindrical fairing winding about the drum 23 is indicated by 34 and bounds the compartments 25 in the radial direction and has, above the conveyors 5 and 6, an opening 25 between two edges shown by 36 and 37.

Whilst the edge 37 is substantially adjacent to an edge of the branches 9 and 10, the edge 36 is spaced from the branches 9 and 10 by a distance substantially equal to the amplitude of a compartment 25 and is connected to the branches 9 and 10 along the entire longitudinal dimension of the store 13 by a rod or bridge 38 provided with a projection 39 pivoted at an intermediate point, via a pin 40 parallel to the shaft 19, on the upper end of an arm 41 pivoted at its lower end, via a pin 42 parallel to the shaft 19, on support means comprising a fork 43 rigid with the guide 11.

An actuator fixed to the fork 43 is shown by 44. An output shaft 45 of the actuator 44 provided with an alternating vertical movement, engages the bridge 38 at the bottom. A spring 46 disposed between the projection 39 and the fork 43 acts as a component opposing the action of the output shaft 45 on the bridge 38.

On the side facing the conveyors 5 and 6, the arm 41 is connected at an intermediate point to the fork 43 by a traction spring 47.

A push button of a microswitch 48 for stopping the entire plant and forming part of a safety device whose function will be described below is disposed in the path of the arm 41 on the opposite side of the spring 47.

As a result of the connection described above, the bridge 38 is able to assume two different positions, i.e. a lower position in which it is disposed with its end facing the conveyors 5 and 6 at a lower level than the branches 9 and 10 and an upper position in which the said end is disposed higher than the branches 9 and 10.

In the position lying above the inlet end of the compartment 25 defined at the base by the branches 9 and 10 there is provided a device for removing the packets 2, shown overall by 49, mounted on one end of a shaft 50 parallel to the shaft 19 and axially slidable in a support 51 rigid with the bell element 18.

The second end of the shaft 50 is connected to one end of an arm of a lever 52 pivoted at its upper end on a pin 53 supported by the bell element 18 and provided in an intermediate zone within a roller sliding in the track of a drum cam 54 keyed on the cyclical shaft 29.

This kinematic connection enables the shaft 50 to slide axially with an alternating movement via the support 51 such that on each complete rotation of the cyclical shaft 29 the extractor device 49 is displaced from an end of stroke position lying above the inlet end of the lower compartment 25 of the store 13 to an end of stroke position outside of this compartment 25 and returns finally to the initial position.

This extractor device 49 comprises gripper means formed by two substantially vertical arms 55 and 56 extending towards the conveyor 5 and provided at their lower or take-up ends with bearings 57 of resilient material.

Whilst the arm 56 is rigid with the shaft 50, the arm 55 is mounted in a rotary manner on a pin 58 parallel to the shaft 50 and mounted on the arm 56.

Above the shaft 50, the arm 56 supports an actuator 59, a horizontal output shaft 60 of which engages, in opposition to the action of a spring 61 wound on the pin 58, with an upper end of the arm 55.

In the vicinity of the inlet and outlet ends of the lower compartment 25 there are provided two interception devices 62 and 63 for the packets 2. Each of these devices 62 and 63 is formed by an arm 64 pivoted on a pin 65 parallel to the shaft 19 and provided at its free end with a plate 66. These arms 64 are able to move, under the control of actuators (not shown), from a disengaged position in which the respective plates do not interfere with the path of the packets 2 supported by the conveyors 5 and 6, to a position (shown in dashed lines in FIG. 2) in which the plates 66 are disposed at the inlet and outlet ends of the lower compartment 25.

In operation, when the machines 3 and 4 have their output fully synchronized, the packets 2 produced by the packaging machine 3 move forward on the conveyors 5 and 6, via the lower compartment 25 of the store 13 which is in the rest position, until they reach the further wrapping machine 4.

In the event of the stoppage of the further wrapping machine 4, this machine supplies an actuation signal to a photocell 67 for detecting the passage of the packets 2 at the outlet end of the compartment 25 which controls the interception device 62.

The command designed to close the interception device 62 on the path of the packets 2 is generated by the photocell 67 as soon as it detects the absence of packets 2 in its control zone.

Following this, the plate 66 may freely move into the position in which the base of the lower compartment 25 is closed without interfering with the packets 2 being supplied. The packets 2 coming from the packaging machine 3 collect adjacent to one another until the lower compartment 25 is completely full.

Detection means formed by a photocell 68 disposed at the inlet end of this compartment 25 detect the filling condition thereof and are enabled by a synchronization cam 69 mounted on the cyclical shaft 29 (see FIG. 3 also) to operate, by means of the actuator 59, the closure of the arms 55 and 56 of the extractor device 49 which is at rest in the end of stroke position lying above the inlet end of the lower compartment 25.

The photocell 68 also supplies a signal to start the motor 28 with a predetermined direction of rotation.

By means of the kinematic connection formed by the cam 54 and the lever 52, the shaft 29 of the motor 28 causes the shaft 50 of the extractor device 49 to move in a parallel and opposite direction to the branch 9.

Following this, the final packet 2 of the group within the lower compartment 25, held gently between the arms 55 and 56, is extracted from the lower compartment 25.

As soon as the extractor device 49 reaches its outer end of stroke position, a synchronization cam 70 mounted on the shaft 29 causes the closure of the interception device 63 which brings its plate 66 into the path of the packets 2 without the risk of damage to the final packet 2 of the group.

After this operation the extractor device 49 re-opens its arms 55 and 56 under the control of a synchronization cam 71 keyed on the shaft 29 and carries out its return stroke up to the position lying above the inlet end of the lower compartment 25, whilst the packets 2 coming from the packaging machine 3 collect adjacent to one another against the plate 66.

It should be noted that the angular stroke of the shaft 29, which is followed by the operation for the removal of the final packet 2 of the group, corresponds to the rest phase of the shaft 31 provided with a discontinuous rotary movement.

Still during the rest phase of the shaft 31, detection means 72 of known type and sensitive to the direction of rotation of the shaft 29 supply a control signal to the actuator 44 associated with the bridge 38. In this condition, the output shaft 45 of the actuator 44 moves into its retracted position such that the bridge 38 has its edge facing towards the conveyors 5 and 6 at a lower level than that of the branches 9 and 10, whilst its edge facing towards the fairing 34 is kept substantially at the same level as the inlet edge 36 of the latter.

The movement stage of the shaft 31 only begins after the closure of the interception device 63, with the consequent rotation of the store 13 about its axis in a clockwise direction, looking at FIG. 2, and by an angle included between two adjacent compartments 25.

Following this rotation, the group of packets 2 between the two interception devices 62 and 63 is moved above the bridge 38 by the conveyors 5 and 6, whilst an empty compartment 25 is disposed above the branches 9 and 10.

When, after the storage operation described above, the further wrapping machine 4 remains blocked, the interception device 62 retains its closed position, whilst the interception device 63 returns to the disengaged position, under the control of a synchronization cam 73 mounted on the shaft 29 so as to enable the flow of packets 2 coming from the packaging machine 3 into the new lower compartment 25 of the store 13 until the latter is completely full.

After the action of the extractor device 49 and the interception device 63, in accordance with the method described above, the store 13 carries out a further rotation transferring a new group of packets 2 from the branches 9 and 10 onto the bridge 38 and the previously formed group from the bridge 38 to a position above the fairing 34.

If the blockage of the further wrapping machine 4 continues, the conveyor apparatus continues to operate in accordance with the methods described above until a predetermined filling level of the store 13 is reached and the entire plant shuts down.

In the event of correct operation of the further wrapping machine 4 and stoppage of the packaging machine 3, the latter supplies an actuation signal to a photocell 74 under whose control the interception device 63 is disposed in the position in which the inlet end of the lower compartment 25 is closed.

The motor 28 of the store 13 is actuated at this point by the photocell 74 in the direction of rotation opposite to the first.

Similarly to the previous case, during the initial phase of the cycle of rotation of the shaft 29 corresponding to the rest phase of the shaft 31 and consequently of the store 13, the means 72 for detecting the direction of rotation of the shaft 29 supply a control signal to the actuator 44 in order to cause the emergence of the shaft 45.

Consequently, the bridge 38 moves into the position shown by a continuous line in FIG. 2 with its edge facing the conveyors 5 and 6 at a higher level than the branches 9 and 10.

When, at the end of this rest phase, the shaft 31 causes the store 13 to rotate in the anti-clockwise direction, a group of packets 2 is transferred from the bridge 38 to the branches 9 and 10 without the risk of contact with the edges of these branches.

The conveyors 5 and 6 carry out the immediate transfer of this group to the further wrapping machine.

Obviously, if the rest condition of the packaging machine 3 continues, the operations described above are repeated cyclically until the entire plant shuts down automatically when a predetermined minimum condition is reached by the reserve of the store 13.

Although two limit conditions have been considered up to now as regards the operation of the store 13, i.e. the stoppage of the supply machine and the stoppage of the machine 4 which receives the products, it is obvious that the apparatus in question may also be used to deal with a fall in output in either machine, alternating storage and supply phases under the control of means for monitoring the production rate of the two machines 3 and 4.

Finally, the possibility of the bridge 38 remaining blocked in the position for the discharge phase of the store 13 (shown by a continuous line in FIG. 2), in the rest position of the further wrapping machine 4, is envisaged.

In this case the safety device mentioned above comes into operation as follows, in order to prevent damage to the packets 2 of cigarettes.

On rotation of the drum 23 in the clockwise direction, the group of packets 2 designed to be stored contact the edge of the bridge 38 which gives way resiliently, rotating in the anti-clockwise direction about the pin 42. Following this rotation, the arm 41 presses the push button of the microswitch 48 which shuts down the entire plant.

Obviously the resilient properties of the spring 47 are such as to enable the rotation of the bridge 38 about the pin 42 without the risk of crushing the group of packets 2.

In the embodiment described and illustrated in FIG. 2, the pin 40 is arranged with respect to the bridge 38 such that the edge of the latter facing towards the edge 36 of the fairing 34 is kept substantially at the same level in the two different operating conditions of the store 13.

In accordance with a variant which is not shown, the pin 40 may be centered substantially below the bridge 38. In this case, the bridge defines with its longitudinal edges, in both operating conditions of the store 13, two downward drops in level with respect to the direction of rotation of the store 13, and more precisely, in addition to the drop in level with respect to the branches 9 and 10, defines a second drop in level with respect to the edge 36 of the fairing 34.

In this variant, the safety device of the type described with reference to a storage operation may also be used in the case of a discharge operation, i.e. to prevent damage to the packets 2 if, during an operation to supply packets 2 to the conveyors 5 and 6, the bridge 38 remains blocked in the storage phase position with its edge facing towards the fairing 34 at a higher level than the edge 36. In this case, following the rotation of the drum 23 in the anti-clockwise direction, a group of packets in a compartment 25 is brought into contact with the edge of the bridge 38 facing the edge 36, by causing the arm 41 to rotate in the anti-clockwise direction until it contacts the push button of a microswitch (not shown) which stops the plant.

It is evident from the above description that the connection apparatus of the present invention completely eliminates sources of damage to the packets as a result of the rotation of the store both during the storage and supply phases.

I claim:

1. An apparatus for supplying substantially parallelepipedic packets between a machine for supplying and a machine for receiving these packets, comprising at least one substantially horizontal conveyor for connection between the machines and a substantially cylindrical store having an axis parallel to the conveyor provided on its periphery with angularly uniformly spaced radial compsartments, lying above the conveyor and substantially tangential thereto, such that the conveyor defines a base wall for the lower compartment of the store, means for the intermittent actuation of the store about its axis, device for intercepting the packets at both ends of the lower compartment and a cylindrical fairing winding about the store, characterised in that it comprises, in the vicinity of the lower compartment and disposed between an edge of the conveyor and an inlet edge of the fairing, a connection bridge designed to assume a first and a second position as a function of the direction of rotation of the store.

2. An apparatus for supplying packets as claimed in claim 1, characterized in that the bridge is mounted to oscillate on a pin, parallel to the axis of rotation of the store, actuator means being provided to displace the bridge between the two positions with movements of rotation about the pin in the same direction of rotation as the store.

3. An apparatus for supplying packets as claimed in claim 2, characterised in that the bridge defines, with respect to the edge of conveyor, a downward drop in level in the direction of rotation of the store.

4. An apparatus for supplying packets as claimed in claim 2, characterised in that the bridge defines, with respect to the edge of the conveyor and the inlet edge of the cylindrical fairing and in both the said positions, two downward drops in level in the direction of rotation of the store.

5. An apparatus for supplying packets as claimed in claim 1, characterised in that it comprises a safety device for detecting incorrect positions assumed by the bridge in relation to the direction of rotation of the store and for controlling the stoppage of the said apparatus.

6. An apparatus for supplying packets as claimed in claim 5, characterised in that the safety device comprises an arm for supporting an upper end of the bridge by means of the pin pivoted at its lower end on fixed support means by means of a second pin parallel to the axis of rotation of the store so as to enable the bridge to perform oscillating movements under the action of forces applied to its longitudinal edges.

7. An apparatus for supplying substantially parallelepipedic packets between a machine for supplying and a machine for receiving these packets, comprising at least one substantially horizontal conveyor for connection between the machines and a substantially cylindrical store having an axis parallel to the conveyor, provided on its periperhy with angularly uniformly spaced radial compartments, lying above the conveyor and substantially tangential thereto, such that the conveyor defines a base wall for the lower compartment of the store, means for the intermittent actuation of the store about its axis, devices for intercepting the packets at both ends of the lower compartment and a cylindrical fairing winding about the store and means for detecting whether the lower compartment is full, characterised in that is comprises an extractor device for single packets operating in the vicinity of the inlet end, with respect to the direction of foward movement of the conveyor, of the lower compartment under the control of the detection means and movable with an alterating movement parallel to the axis of the store between a position within and a position outside of the lower compartment.

8. An apparatus for supplying substantially parallelepipedic packets between a machine for supplying and a machine for receiving these packets, comprising at least one substantially horizontal conveyor for connection between the machines and a substantially cylindrical store having an axis parallel to the conveyor, provided on its periphery with angularly uniformly spaced radial compartments, lying above the conveyor and substantially tangential thereto, such that the conveyor defines a base wall for the lower compartment of the store, means for the intermittent actuation of the store about its axis, devices for intercepting the packets at both ends of the lower compartment and a cylindrical fairing winding about the store and means for detecting whether the lower compartment is full, characterised in that it comprises an extractor device for single packets operating in the vicinity of the inlet end, with respect to the direction of forward movement of the conveyor, of the lower compartment under the control of the detection means and movable with an alternating movement parallel to the axis of the store between a position within and a position outside of the lower compartment, said apparatus further characterized in that it comprises, in the vicinity of the lower compartment and disposed between an edge of the conveyor and an inlet edge of the fairing, a connection bridge designed to assume a first and a second position as a function of the direction of rotation of the store, and wherein said bridge defines, with respect to the edge of the conveyor, a downward drop in level in the direction of rotation of the store during a storage phase for said packets and an upward inclination in level, with respect to the edge of the conveyor, in the direction of rotation of the store during a releasing phase of said packets from the store to the conveyor.

9. An apparatus for supplying packets as claimed in claim 8, characterised in that the bridge is mounted to oscillate on a pin, parallel to the axis of rotation of the store, actuator means being provided to displace the bridge between the two positions with movement of rotation about the pin in the same direction of rotation as the store.

10. An apparatus for supplying packets as claimed in claim 8, characterised in that the bridge defines, with respect to the edge of the conveyor and the inlet edge of the cylindrical fairing and in both the said positions, two downward drops in level in the direction of rotation of the store.

11. An apparatus for supplying packets as claimed in claim 8, characterised in that it comprises a safety device for detecting incorrect positions assumed by the bridge in relation to the direction of rotation of the store and for controlling the stoppage of the said apparatus.

12. An apparatus for supplying packets as claimed in claim 11, characterized in that the safety device comprises an arm for supporting an upper end of the bridge by means of the pin pivoted at its lower end on fixed support means by means of a second pin parallel to the axis of rotation of the store so as to enable the bridge to perform oscillating movements under the action of forces applied to its longitudinal edges.

* * * * *